United States Patent
Mei (10) Patent No.: US 9,037,085 B2
(45) Date of Patent: May 19, 2015

(54) METHOD FOR SHARING DATA BETWEEN DEVICES

(71) Applicant: HTC Corporation, Taoyuan County (TW)

(72) Inventor: Chung-Huan Mei, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 222 days.

(21) Appl. No.: 13/732,444

(22) Filed: Jan. 2, 2013

(65) Prior Publication Data

US 2014/0187162 A1    Jul. 3, 2014

(51) Int. Cl.
    *H04W 4/00*    (2009.01)

(52) U.S. Cl.
    CPC .................................. *H04W 4/008* (2013.01)

(58) Field of Classification Search
    USPC ........ 455/41.1, 41.2, 41.3, 422.1, 450, 452.1, 455/453, 67.11, 550.1, 566, 575.1
    See application file for complete search history.

(56) References Cited

U.S. PATENT DOCUMENTS

| | | |
|---|---|---|
| 2006/0256074 A1 | 11/2006 | Krum et al. |
| 2011/0070837 A1* | 3/2011 | Griffin et al. ................ 455/41.3 |
| 2011/0081923 A1 | 4/2011 | Forutanpour et al. |
| 2011/0314168 A1 | 12/2011 | Bathiche et al. |
| 2013/0225077 A1* | 8/2013 | Schultz et al. ............... 455/41.1 |
| 2014/0113549 A1* | 4/2014 | Beg et al. .................... 455/41.1 |
| 2015/0011162 A1 | 1/2015 | Awad |

FOREIGN PATENT DOCUMENTS

| | | |
|---|---|---|
| DE | 10 2004 003 755 A1 | 8/2005 |
| EP | 2 302 883 A1 | 3/2011 |
| EP | 2 521 342 A1 | 11/2012 |
| TW | 201246686 | 11/2012 |
| TW | 201301798 | 1/2013 |

OTHER PUBLICATIONS

Office action mailed on Feb. 13, 2014 for the Germany application No. 102013218005.5, p. 1-14.
Office action mailed on Feb. 13, 2015 for the Taiwan application No. 102110483, filed: Mar. 25, 2013, p. 1-7.

\* cited by examiner

*Primary Examiner* — Thanh Le
(74) *Attorney, Agent, or Firm* — Winston Hsu; Scott Margo (57) ABSTRACT

A method for data sharing between a first device and a second device is disclosed. The method includes steps of the first device detecting whether the second device is within a specific range; at least first one of the first device and the second device exchanging at least one spatial condition information through a communication channel if the second device is within the specific range; at least second one of the first device and the second device verifying whether the at least one spatial condition information matches a predefined condition; and the at least second one of the first device and the second device activating data sharing between the first device and the second device when the at least one spatial condition information matches the predefined condition.

19 Claims, 5 Drawing Sheets

METHOD FOR SHARING DATA BETWEEN DEVICES

BACKGROUND OF THE INVENTION

1. Field of the Invention

The present invention relates to a method for data sharing between devices, and more particularly, to a method capable of sharing data between devices when the devices are within a specific range and spatial condition information of the devices matches a predefined condition, so as to intuitionally and conveniently share data between devices.

2. Description of the Prior Art

With advancement and popularization of mobile communication technologies, wireless voices and data communication services are widely used by mass population, and affect life style, business model, etc. Therefore, it is more and more popular for people to use mobile devices to share information or data, such as multimedia streams, photos, web link addresses, etc.

However, although there are various conventional methods for sharing information or data between mobile devices, it is not convenient to trigger the sharing. For example, when a user intends to use mobile devices to share information or data, the user needs to open a sharing application first, and then find out sharing function item to activate sharing mechanism, so as to start sharing information or data between mobile devices. Under such a situation, the conventional methods for sharing information or data between mobile devices often require complicated operating steps, and causes inconvenience. Therefore, there is a need to improve over the prior art to have a more intuitional and convenient method to share information or data through mobile devices.

SUMMARY OF THE INVENTION

It is therefore an objective of the present invention to provide an operating mode switching method capable of data sharing between devices when the devices are within a specific range and spatial condition information of the devices matches a predefined condition, so as to intuitionally and conveniently share data between devices.

The present invention discloses a method for data sharing between a first device and a second device. The method includes steps of the first device detecting whether the second device is within a specific range; at least first one of the first device and the second device exchanging at least one spatial condition information through a communication channel if the second device is within the specific range; at least second one of the first device and the second device verifying whether the at least one spatial condition information matches a predefined condition; and the at least second one of the first device and the second device activating data sharing between the first device and the second device when the at least one spatial condition information matches the predefined condition.

DETAILED DESCRIPTION

Figure 1:
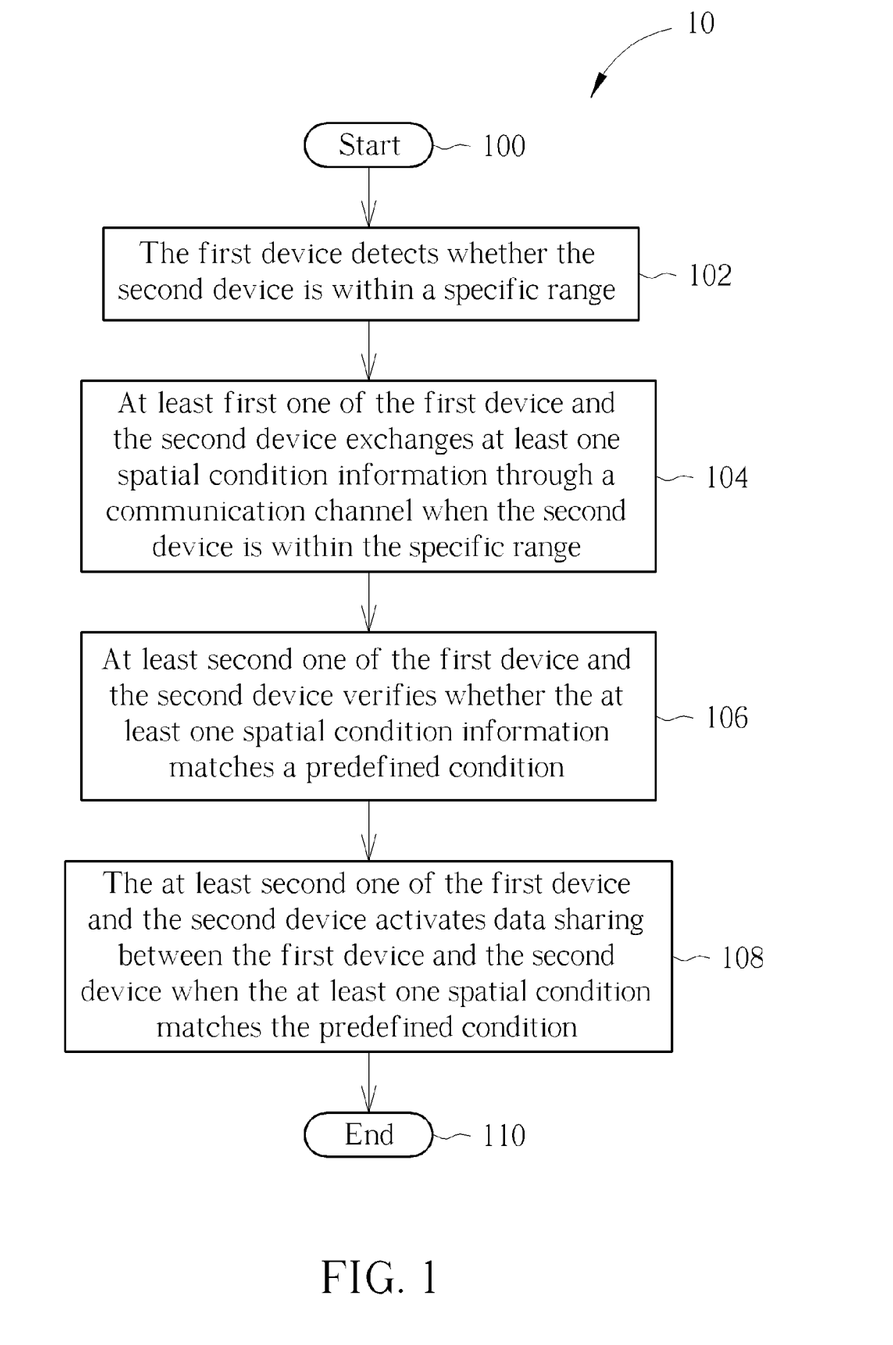
FIG. 1 illustrates a schematic diagram of a data sharing process according to an embodiment of the present invention.

Please refer to FIG. 1, which illustrates a schematic diagram of a data sharing process 10 according to an embodiment of the present invention. The data sharing process 10 is utilized for sharing data between a first device and a second device. The first device and the second device can be any kind of electronic products supporting data communications, such as smart phones, personal digital assistants, portable computers, etc. The data sharing process 10 comprises the following steps:

Step 100: Start.

Step 102: The first device detects whether the second device is within a specific range.

Step 104: At least first one of the first device and the second device exchanges at least one spatial condition information through a communication channel when the second device is within the specific range.

Step 106: At least second one of the first device and the second device verifies whether the at least one spatial condition information matches a predefined condition.

Step 108: The at least second one of the first device and the second device activates data sharing between the first device and the second device when the at least one spatial condition matches the predefined condition.

Step 110: End.

According to the data sharing process 10, the first device detects whether the second device is within a specific range. When the second device is within the specific range, at least first one of the first device and the second device exchanges at least one spatial condition information through a communication channel, and at least second one of the first device and the second device verifies whether the at least one spatial condition information matches a predefined condition (i.e. the first device exchanges spatial condition information to the second device and the second device performs verification, or the second device exchanges spatial condition information to the first device and the first device performs verification, or both the first device and the second device exchanges spatial condition information to the other devices and both devices perform verification). If the at least one spatial condition information matches the predefined condition, the at least second one of the first device and the second device activates data sharing between the first device and the second device.

Under such a situation, when the first device and the second device are in proximity, and the at least one spatial condition information matches the predefined condition, data sharing between the first device and the second device is automatically activated without other operations from users. As a result, the users only need to put the first device and the second device in proximity and matching the predefined condition and do not need to select or operate on any user interfaces, and then data sharing between the two devices can be automatically activated without complicated operating steps, so as to intuitionally and conveniently share information or data between different devices.

Figure 2:
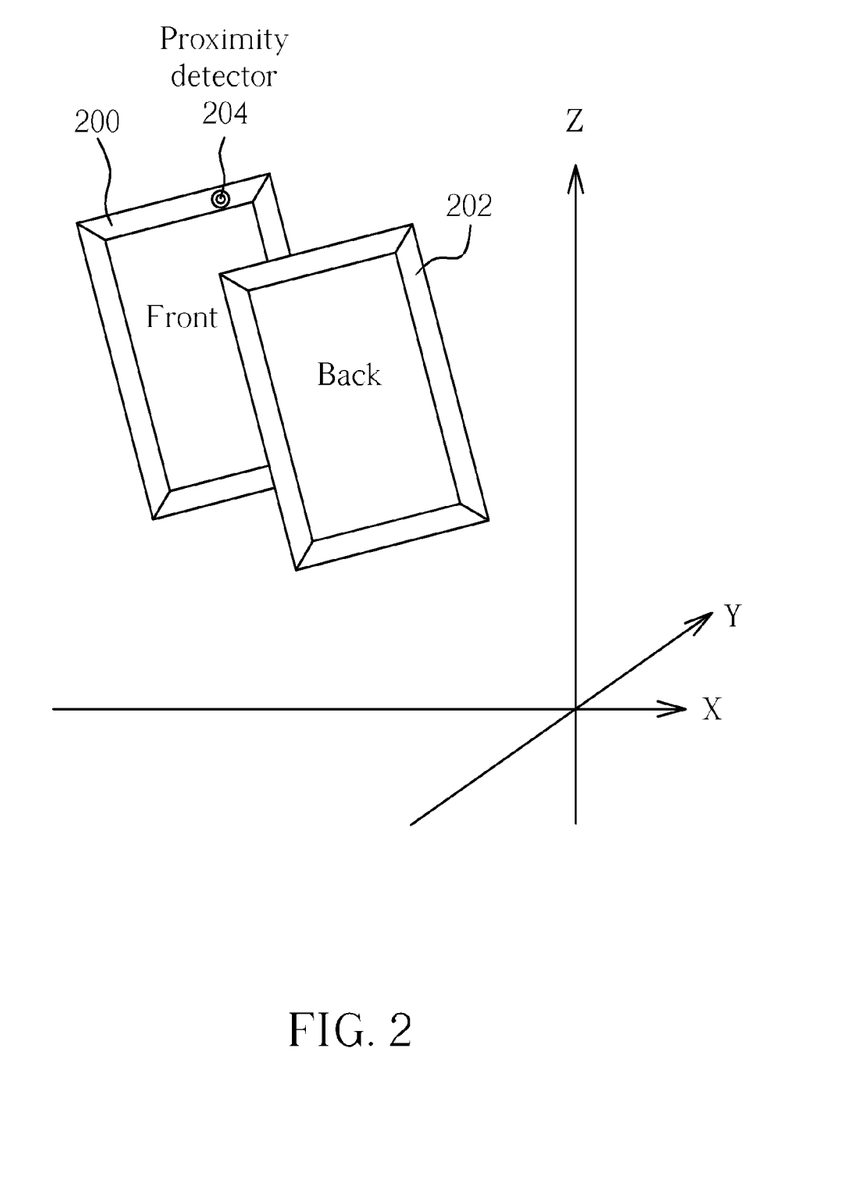
FIG. 2 illustrates two devices performing the data sharing process according to an embodiment of the present invention.

In detail, please refer to FIG. 2, which illustrates devices 200, 202 performing data sharing process 10 according to an embodiment of the present invention. As shown in FIG. 2, when a user of the device 200 intends to share digital data to the device 202, wherein the digital data may be already shown on a display screen of the device 200, the user moves the device 200 close to the device 202. Under such a situation, according to Step 102, the device 200 may use a proximity detector 204 to detect whether the device 202 is within a specific range. Noticeably, the device 202 can also be equipped with another proximity detector for detecting as well.

Then, since the device 200 and the device 202 represent two independent electronic devices, the Steps 104, 106, and 108 may be performed by one or both of the device 200 and the device 202 according to different configurations. For example, in a first scenario, both the device 200 and the device 202 are equipped with proximity detectors, and thus both the device 200 and the device 202 can detect whether each other in proximity and decide whether to perform Steps 104, 106, and 108 of the data sharing process 10 independently. In a second scenario, although both the device 200 and the device 202 are equipped with proximity sensors, in order to reduce device power consumption and data sharing procedures in one device, detection in only one of the device 200 and the device 202 is considered (e.g. detection in only the device 200 is considered). In a third scenario, the device 202 might not be equipped with a proximity sensor, and thus the proximity detection could only be performed in the device 200.

Specifically, in a first embodiment for the first scenario, according to Step 104, when both the device 200 and the device 202 detect each other in proximity, the device 200 may send a first spatial condition information of the device 200 to the device 202, and the device 202 may send a second spatial condition information of the device 202 to the device 200. Correspondingly, according to Step 106, both the device 200 and the device 202 verify whether both the first spatial condition information and the second spatial condition information match the predefined condition (e.g. the device 200 and the device 202 are in a condition of facing toward each other). Thus, according to Step 108, the device 200 and the device 202 activate data sharing when both the first spatial condition information and the second spatial condition information match the predefined condition. As a result, both the device 200 and the device 202 detect whether the other is in proximity to send respective spatial condition information to the other, and both determine whether the predefined condition is matched accordingly, so as to automatically activate data sharing.

In a second embodiment for the second scenario and the third scenario, according to Step 104, when both the device 200 and the device 202 detect the other in proximity but detection in only the device 200 is considered, or only the device 200 equipped with the proximity detector 204 detects the device 202 in proximity, the device 200 may send an initial handshake command to the device 202, and then the device 202 may send a second spatial condition information and/or a handshake acknowledgement to the device 200 according to the initial handshake command. Correspondingly, according to Step 106, the device 200 may verify whether the second spatial condition information sent from the device 202 matches the predefined condition. Thus, according to Step 108, the device 200 activates data sharing when the second spatial condition sent from the device 202 matches the predefined condition. As a result, detection in only the device 200 is considered for determining whether the device 202 in proximity, such that the device 200 can send the initial handshake command to the device 202 to request the second spatial condition information, and then the device 200 determines whether the predefined condition is matched accordingly, so as to automatically activate data sharing.

Figure 3A:
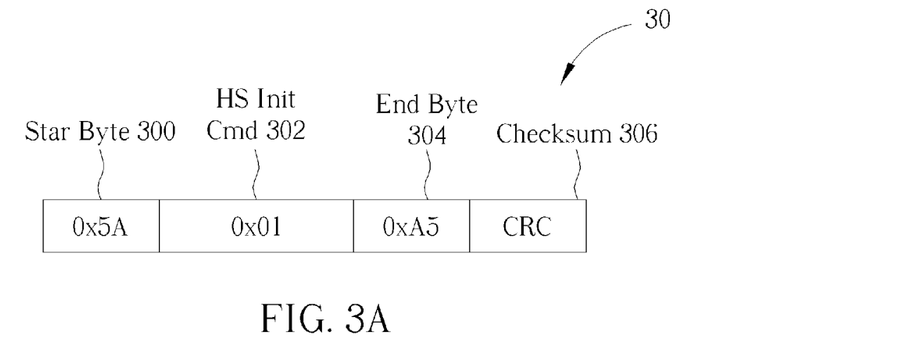
FIG. 3A illustrates a data packet according to an embodiment of the present invention.

For realization of sending the initial handshake command, please refer to FIG. 3A, which illustrates a data packet 30 according to an embodiment of the present invention. As shown in FIG. 3A, the data packet 30 includes a start byte 300, an initial handshake command 302, an end byte 304 and a checksum 306. The start byte 300 and the end byte 304 represent the start and end of a packet. The checksum 306 represents the cyclic redundancy check (CRC) checksum of the entire packet 30 for data error detection and correction. The initial handshake command 302 could be used to inform another device to send the spatial condition information or start the data sharing process 10. For example, the device 200 sends the data packet 30 including the initial handshake command 302 to the device 202 to inform the device 202 to send the second spatial condition information of the device 202 back to the device 200.

In a third embodiment for the second scenario and the third scenario, according to Step 104, when both the device 200 and the device 202 detect the other in proximity but detection in only the device 200 is considered, or only the device 200 equipped with the proximity sensor detects the device 202 in proximity, the device 200 may send a first spatial condition information of the device 200 to the device 202, and the device 202 may send a handshake acknowledgement to the device 200 after receiving the first spatial condition information of the device 200. Correspondingly, according to Step 106, the device 202 may verify whether the first spatial condition information matches the predefined condition. Thus, according to Step 108, the device 202 activates data sharing when the first spatial condition sent from the device 200 matches the predefined condition. As a result, detection in only the device 200 is considered for determining whether the device 202 in proximity, such that the device 200 can send the first spatial condition information to the device 202, and then the device 202 determines whether the predefined condition is matched accordingly, so as to automatically activate data sharing.

Figure 3B:
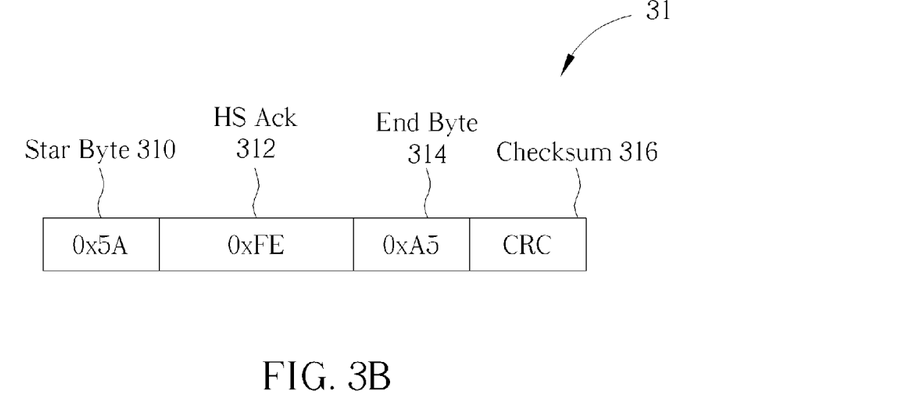
FIG. 3B illustrates another data packet according to an embodiment of the present invention.

For realization of sending the handshake acknowledgement, please refer to FIG. 3B, which illustrates a data packet 31 according to an embodiment of the present invention. As shown in FIG. 3B, the data packet 31 includes a start byte 310, a handshake acknowledgement 312, an end byte 314 and a checksum 316. The purposes of the start byte 310, the end byte 314 and the checksum 316 are the same as described in FIG. 3A. The handshake acknowledgement 312 could be used to inform another device whether the received data is expected. For example, the device 202 sends the data packet 31 including the handshake acknowledgement 312 indicating whether the first spatial condition information received from the device 200 matches the predefined condition on the device 202 or not.

Figure 3C:
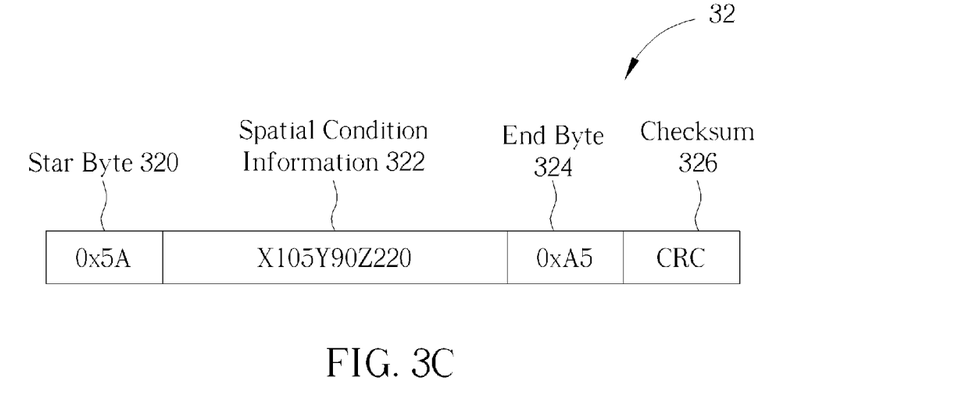
FIG. 3C illustrates a further data packet according to an embodiment of the present invention.

For realization of sending the at least one spatial condition information, please refer to FIG. 3C, which illustrates a data packet 32 according to an embodiment of the present invention. As shown in FIG. 3B, the data packet 32 includes a start byte 320, spatial condition information 322, an end byte 324 and a checksum 326. The purposes of the start byte 320, the end byte 324 and the checksum 326 are also the same as described in FIG. 3A. The spatial condition information 322 represents how the device 200 or the device 202 is placed, and may be corresponding to at least one spatial disposition (spatial orientation), at least one moving trace, etc. of the device 200 or the device 202, according to implementation of the device 200 and the device 202. For example, the spatial condition information 322 may be obtained by spatial condition information detector such as an accelerometer sensor, a gyroscope sensor, or a compass sensor, etc. of the device 200 or the device 202.

Specifically, for the device 200 or the device 202 equipped with an accelerometer, the spatial condition information 322 contains data X105Y90Z220, as shown in FIG. 3C, which means that in a scale range from value 0-255, the X-axis gravity value is 105, the Y-axis gravity value is 90 and the Z-axis gravity value is 220 in three-dimensional space at a specific moment. Therefore, by exchanging the accelerometer spatial condition information, the device 200 and the device 202 are able to determine whether the spatial condition information of the other device at the specific moment is matched to the predefined condition and decide whether to activate data sharing.

Noticeably, the spatial condition information obtained from accelerometer is just an example. There are still lots of components that are capable to measure device spatial condition information, such as the gyroscope sensor and the compass sensor. Therefore, the spatial condition information 332 can be more complex by combining varieties of spatial condition information obtained from varieties of spatial motion sensors. For example, it could be formed by any combination of spatial condition information obtained from accelerometer sensor, gyroscope sensor and compass sensor. By combining varieties of spatial condition information from these spatial condition information detectors, the spatial condition information could also represent spatial disposition, at least one moving trace, etc. of the device 200 or the device 202, so that the device 200 and the device 202 could exchange the spatial condition information according to respective spatial disposition.

Then, when the at least one spatial condition of the device 200 and the device 202 matches the predefined condition, data sharing between the device 200 and the device 202 can be automatically activated. However, although activating the data sharing requires the device 200 and the device 202 in proximity and matching the predefined spatial condition, it is still likely to accidently activate the data sharing without notice of user. For example, when a user puts both the device 200 and the device 202 in the same backpack, if both devices also have the same disposition and spatial condition, the data sharing is likely to be activated accidently. For another example, if a user leaves the device 200 on the desktop in the office, people having the device 202 tend to steal personal information from the device 200 could simply approach the device 202 to the device 200 in proximity, then activate the data sharing silently. In order to prevent this scenario, the predefined condition can be added with additional requirement such as making sure that the device 200 or the device 202 is hold by user hand, the device 200 and the device 202 are in a condition of facing to a predefined direction (e.g. display panel sides are facing to each other as shown in FIG. 2) to a predefined direction, or a physical key, a virtual key on touch screen or an image on touch screen is pressed by user. A hold sensor (not shown in FIG. 2) capable of detecting whether user hand is holding a device can be implemented to detect whether the device is hold by user. Additionally combination of spatial condition information, especially the compass condition information, could detect whether the device is facing to a predefined direction. For example, the spatial condition information is monitored to check whether the device 200 and the second are facing to each other. By these additional requirements of predefined condition, users are more likely aware of whether they really tend to share data. As a result, accidently activating data sharing could be prevented.

Besides, in other embodiments, the at least one spatial condition of the device 200 and the device 202 can be moving traces of the device 200 and the device 202, and the predefined condition can be a moving trace pattern of the device 200 and the device 202.

Figure 4A:
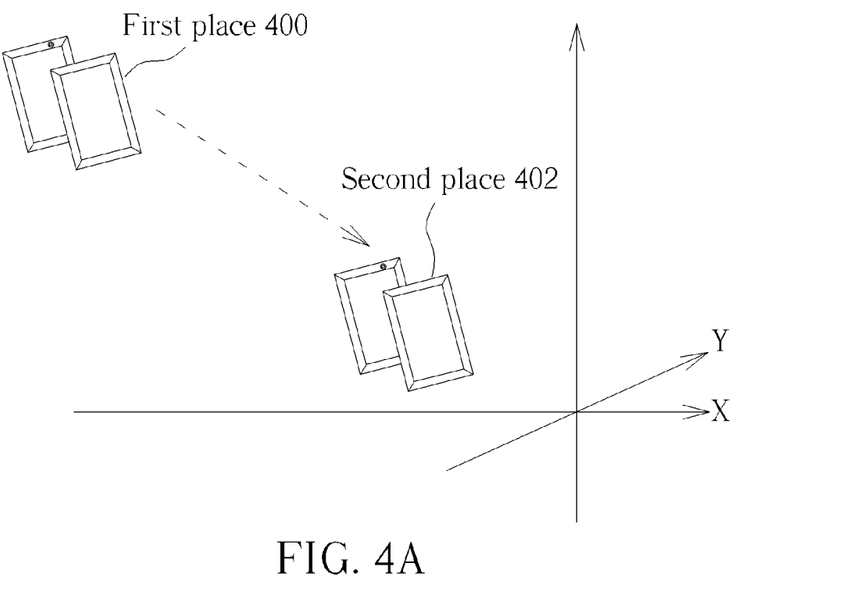
FIG. 4A illustrates the two devices shown in FIG. 2 performing the data sharing process according to another embodiment of the present invention.

For example, please refer to FIG. 4A, which illustrates the devices 200, 202 performing data sharing process 10 according to another embodiment of the present invention. As shown in FIG. 4A, the device 200 and the device 202 move linearly from a first place 400 to a second place 402 with the same disposition. The linear moving trace and disposition information are obtained from combination of respective spatial condition information detectors and are recorded as the spatial condition information to exchange to another device. Since both the device 200 and the device 202 match the predefined condition (i.e. moving toward the same direction linearly), the device 200 and the device 202 activate data sharing.

Figure 4B:
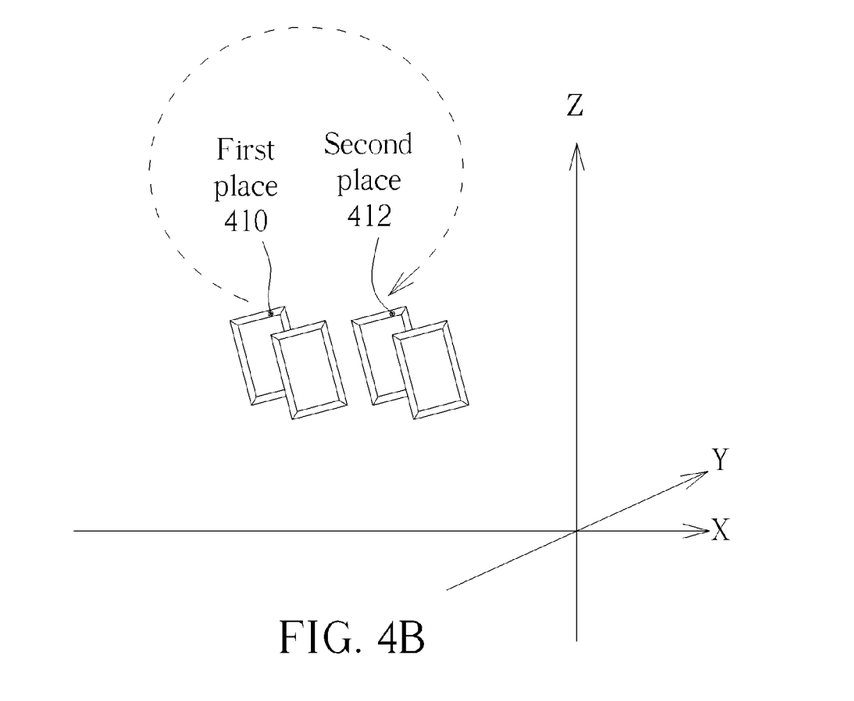
FIG. 4B illustrates the two devices shown in FIG. 2 performing the data sharing process according to a further embodiment of the present invention.

For another example, please refer to FIG. 4B, which illustrates the devices 200, 202 performing data sharing process 10 according to a further embodiment of the present invention. As shown in FIG. 4B, the device 200 and the device 202 move circularly from a first place 410 to a second place 412 with the same disposition. The circular move trace and disposition information are obtained from combination of respective spatial condition information detectors and are recorded as the spatial condition information to exchange to another device. Since both the device 200 and the device 202 match the predefined condition (i.e. moving circularly), the device 200 and the device 202 activate data sharing.

Noticeably, other than the above embodiments, the predefined condition for the verification could be realized in many different ways. For example, the predefined condition can be a predetermined constant data stored in device storage such as flash memory or random-access memory (RAM). It could also be an adjustable user defined value or a user pre-recorded serial values representing a moving trace of device. Besides, if users want to define their own predefined condition, the users can execute a calibration application, which records user-defined spatial condition information as pre-defined condition data, to generate and store the predefined condition. Moreover, the predefined condition can be obtained directly from spatial condition information detector in real time while the device is going to compare to the received spatial condition information sent from anther device. In this case, as long as the device 200 and the device 202 have the same spatial condition after comparison, they match the predefined condition. Under such a situation, the device 200 and the device 202 do not need to always follow a constant and predetermined spatial condition. Moreover, the predefined condition does not need to require the device 200 and the device 202 to have the same spatial condition. In fact, the predefined condition is more like a device spatial condition relationship between the device 200 and the device 202 in three-dimensional space.

Finally, once the data sharing is securely activated, data to be shared is directly transmitted from one of the device 200 and the device 202 to anther of the device 200 and the device 202. The data to be shared could be entire or part of digital contents displayed on the display screen or information relevant to contents displayed on the display screen. For example, when a user of the device 200 wants to share a photo which the user is currently watching on display screen or an URL (website link address) of current browsing web page, the user just needs to remain the photo on the display screen and puts the device 200 to the device 202 in proximity and matching the predefined condition. The content to be shared could be any digital content includes but is not limited to a multimedia stream, a web link address, a remote control, and an online game.

Noticeably, the spirit of the present invention is to put the first device and the second device in proximity and matching the predefined condition, such that data sharing between the two devices can be automatically activated without complicated operating steps from users, so as to intuitionally and conveniently share information or data between different devices. Those skilled in the art can make modifications or alterations accordingly. For example, the proximity detector 204 can be a sensor or a reader capable of detecting presence of nearby objects without any physical contact, and may be an infrared red sensor, a proximity sensor, a near field communication (NFC) reader or a radio frequency identification (RFID) reader, etc. Usually the proximity detector 204 emits a beam of electromagnetic radiation, e.g. an infrared beam, and monitors for changes in the field by returned signals. The specific range for detecting object in proximity depends on the sensitivity and capability of the proximity detector 204 equipped in the device 200. The proximity detector 204 can also provide interface and method for user to adjust the sensitivity of proximity detection. Therefore users could adjust the detection sensitivity and thus the specific range according to different requirements.

Besides, the wireless communication channel for exchanging the at least one spatial condition information can be Bluetooth, wireless local area network (WLAN), near field communication (NFC), radio frequency identification (RFID) or telephony network (e.g. Universal Mobile Telecommunications System (UMTS) and Long Term Evolution (LTE)) connection, etc. Therefore the wireless communication channel between the first device and the second device might be established manually by user (e.g. through standard Bluetooth paring mechanism) for the first time prior to exchanging any data.

Figure 5:
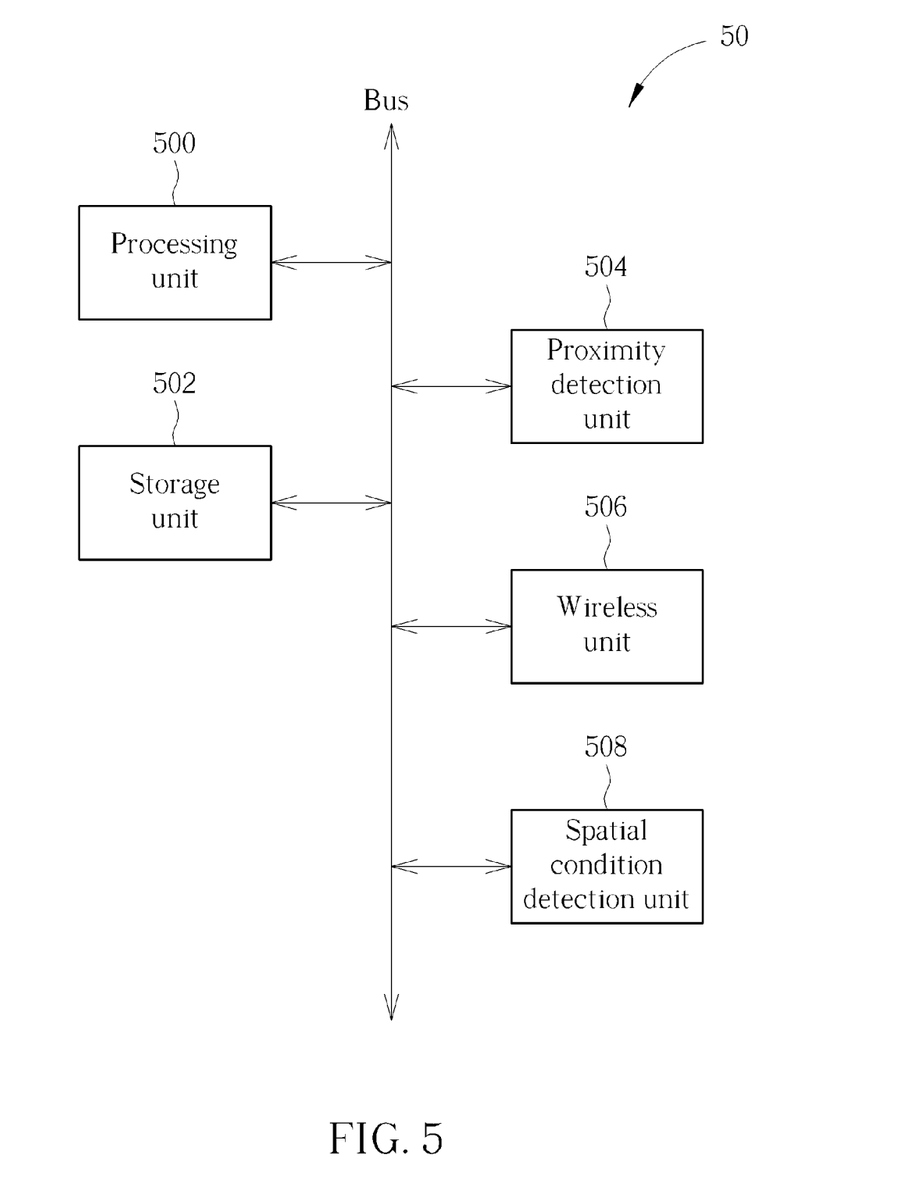
FIG. 5 is a schematic diagram of a communication device for realizing the two devices shown in FIG. 2 according to an embodiment of the present invention.

Additionally, the data sharing process 10 can be realized by software program code. For example, please refer to FIG. 5, which is a schematic diagram of a communication device 50 for realizing the devices 200, 202 according to an embodiment of the present invention. The communication device 50 may include a processing unit 500, a storage unit 502, a proximity detection unit 504 (the device 202 can optionally include the proximity detection unit 504), a wireless unit 506 and a spatial condition detection unit 508. The processing unit 500 can be a microprocessor or an Application Specific Integrated Circuit (ASIC). The storage unit 502 may be a computer readable recording medium or any data storage device that can store a program code read and performed by the processing unit 500. Examples of the storage unit 502 includes but is not limited to a read-only memory (ROM), flash memory, random-access memory (RAM), CD-ROM/DVD_ROM, magnetic tape, hard disk, optical data storage device and solid-state drive (SSD). The proximity detection unit 504 can be a proximity detector such as an infrared proximity sensor, a near field communication (NFC) reader or a radio frequency identification (RFID) reader. The wireless unit 506 can be a wireless communication connection module such as Bluetooth, wireless local area network (WLAN), near field communication (NFC), radio frequency identification (RFID) or telephony network connections. The spatial condition detection unit 508 includes but is not limited to an accelerometer sensor, gyroscope sensor and compass sensor that can measure the spatial motion condition of device. Therefore, the software program code stored in the storage unit 502 could be executed by processing unit 500 to perform the data sharing process 10.

In the prior art, when users intend to use mobile devices to share information or data, the users need to open a sharing application first, and then find out sharing function item to activate sharing mechanism, which requires inconvenient and complicated operating steps from the users. In comparison, the present invention only needs put the first device and the second device in proximity and matching the predefined condition, and then data sharing between the two devices can be automatically activated without complicated operating steps from users, so as to intuitionally and conveniently share information or data between different devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for data sharing between a first device and a second device, the method comprising:
    the first device detecting whether the second device is within a specific range;
    at least first one of the first device and the second device exchanging at least one spatial condition information through a communication channel if the second device is within the specific range;
    at least second one of the first device and the second device verifying whether the at least one spatial condition information matches a predefined condition, wherein the predefined condition comprises the first device and the second device having a same spatial condition information; and
    the at least second one of the first device and the second device activating data sharing between the first device and the second device when the at least one spatial condition information matches the predefined condition, wherein the shared data comprises entire or part of digital contents displayed on a display screen of the at least second one of the first device and the second device or information relevant to content displayed on the display screen of the at least second one of the first device and the second device.

2. The method of claim 1, wherein the step of the at least one of the first device and the second device exchanging the at least one spatial condition information comprises:
    the first device sending a first spatial condition information of the first device to the second device; and
    the second device sending a second spatial condition information of the second device to the first device.

3. The method of claim 2, wherein the step of the at least one of the first device and the second device verifying whether the at least one spatial condition information matches the predefined condition comprises:
    both the first device and the second device verifying whether the first spatial condition information and the second spatial condition information matches the predefined condition.

4. The method of claim 1, wherein the step of the at least one of the first device and the second device exchanging the at least one spatial condition information comprises:
    the first device sending an initial handshake command to the second device; and
    the second device sending a second spatial condition information to the first device according to the initial handshake command.

5. The method of claim 4, wherein the step of the at least one of the first device and the second device verifying whether the at least one spatial condition information matches the predefined condition comprises:
the first device verifying whether the second spatial condition information matches the predefined condition.

6. The method of claim 4 further comprising:
the second device replying a handshake acknowledgement to the first device after receiving the initial handshake command.

7. The method of claim 1, wherein the step of the at least one of the first device and the second device exchanging the at least one spatial condition information comprises:
the first device sending a first spatial condition information of the first device to the second device; and
the second device sending a handshake acknowledgement to the first device after receiving the first spatial condition information of the first device.

8. The method of claim 7, wherein the step of the at least one of the first device and the second device verifying whether the at least one spatial condition information matches the predefined condition comprises:
the second device verifying whether the first spatial condition information matches the predefined condition.

9. The method of claim 1, wherein the specific range is a range capably detected by a proximity detector of the first device.

10. The method of claim 9, wherein the proximity detector is a proximity sensor, a near field communication (NFC) reader or a radio frequency identification (RFID) reader.

11. The method of claim 1, wherein the at least one spatial condition information is corresponding to at least one spatial disposition of the first device and the second device.

12. The method of claim 1, wherein the at least one spatial condition information is corresponding to at least one moving trace of the first device and the second device.

13. The method of claim 1, wherein the at least one spatial condition information is obtained by an accelerometer sensor, a gyroscope sensor or a compass sensor.

14. The method of claim 1, wherein the predefined condition comprises the first device and the second device are in a condition of facing to a predefined direction.

15. The method of claim 1, wherein the predefined condition comprises the first device or the second device is held by a user.

16. The method of claim 1, wherein the predefined condition further comprises a physical key, a virtual key or an image on touch screen being pressed by a user.

17. The method of claim 1, wherein the communication channel conforms to a protocol standard of bluetooth, wireless local area network (WLAN), near field communication (NFC), radio frequency identification (RFID) or telephony network connection.

18. The method of claim 1, wherein data shared between the first device and the second device comprises at least part of digital contents displayed on the display screen or information relevant to contents displayed on the display screen.

19. The method of claim 1, wherein the predefined condition comprises the first device and the second device move toward a same direction.

* * * * *